US007740734B2

(12) United States Patent
Sudo et al.

(10) Patent No.: US 7,740,734 B2
(45) Date of Patent: Jun. 22, 2010

(54) LOW SHRINKAGE EPOXY-CATIONIC CURABLE COMPOSITIONS

(75) Inventors: Atsushi Sudo, Tokyo (JP); Akane Suzuki, Akita (JP); Takeshi Endo, Yokohama (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 7 days.

(21) Appl. No.: 12/275,772

(22) Filed: Nov. 21, 2008

(65) Prior Publication Data

US 2009/0087571 A1 Apr. 2, 2009

Related U.S. Application Data

(63) Continuation of application No. PCT/EP2007/054827, filed on May 18, 2007.

(30) Foreign Application Priority Data

May 22, 2006 (EP) .................................. 06010525

(51) Int. Cl.
*C09J 163/00* (2006.01)
*B05D 3/02* (2006.01)
*B05D 3/06* (2006.01)
*C08L 63/00* (2006.01)
*B32B 27/38* (2006.01)

(52) U.S. Cl. ........................ 156/330; 427/386; 523/400; 525/533

(58) Field of Classification Search .................. None
See application file for complete search history.

(56) References Cited

U.S. PATENT DOCUMENTS 4,701,513 A 10/1987 Lin
2008/0003369 A1* 1/2008 Uenishi et al. .............. 427/386

FOREIGN PATENT DOCUMENTS

| EP | 0 436 025 A1 | | 7/1991 |
|----|---|---|---|
| JP | 59-149924 | | 8/1984 |
| JP | 59-199712 | | 11/1984 |
| JP | 2002-128785 A | * | 5/2002 |
| JP | 2002-322268 A | * | 11/2002 |
| WO | WO 03/076544 A | | 9/2003 |
| WO | WO 2006/087111 A1 | * | 8/2006 |

OTHER PUBLICATIONS

International Search Report for PCT/EP2007/054827 dated Jul. 19, 2007.*
Machine translation of JP 2002-322268 A, provided by the JPO website (no date).*
Nobukatsu Nemoto et al., "Cationic Ring-Opening Polymerization of Monothiocarbonate with a Norbornene Group", J. of Polym. Sci., Polym. Chem. Ed., Interscience Publishers, 40, 11, 1698-1705 (2002).
Nishizawa Susumu et al., "A Preparation of 6,11-dihydrodibenz[b,e]]oxepin-11-ones", Caplus (2008).
Xavier Fernandez et al., "Cationic Copolymerization of Cycloaliphatic Epoxy Resin with a Spirobislactone with Lanthanum Triflate as Initiator 1. Characterization and Shrinkage", J. Polym. Sci., Part A: Polym. Chem., 43, 3421-32 (2005).
Ugo Azzena et al., "Reductive Cleavage of Benzannelated Cyclic Ethers and Amines: Synthetic Applications", *Tetrahedron* 56 (2000).
Volker Brandmeier et al., "A Macrocycle Containing Two Biphenyl and Two Alanine Subunits, Synthesis And Conformation in Solution", *Tetrahedron* 45, 5, 1365-76 (1989).

* cited by examiner

*Primary Examiner*—Michael J Feely
(74) *Attorney, Agent, or Firm*—Steven C. Bauman

(57) ABSTRACT

The present invention relates to compositions comprising an epoxy resin; a reagent selected from the group of cationic compounds or compounds which are capable to form cationic compounds or mixtures of those; at least one compound with two aromatic rings and at least one central cyclic oxygen bridged ring and the use of such compositions in adhesives, sealants and coatings.

21 Claims, No Drawings

LOW SHRINKAGE EPOXY-CATIONIC CURABLE COMPOSITIONS

BACKGROUND OF THE INVENTION

1. Field of the Invention

The present invention relates to compositions comprising an epoxy resin; a reagent selected from the group of cationic compounds or compounds which are capable to form cationic compounds or mixtures of those; at least one compound with two aromatic rings and at least one central cyclic oxygen bridged ring and the use of such compositions to reduce shrinkage.

2. Brief Description of the State of the Technology

Curable compositions containing epoxide and cationic initiator (Bronsted acid, Lewis acid, and there derivatives involving various latent initiators) are widely used for adhesives, sealants, and coatings. Additionally these compositions are regarded as the most promising ones for electrochip bonding and underfills.

However, these compositions suffer from their volume shrinkage during curing reactions. The volume shrinkage during the curing reaction causes the formation of voids and micro-cracks in the cured material, and thus results in lowering the mechanical strength of the material. Especially in such semiconductor package and assembly applications, shrinkage causes contact failure between the adhesive and the substrate, thus leading to adhesion failure. More importantly, however, moisture can reach the surface of the substrate through voids and cracks, damaging the semiconductor chip and other components.

The problem of volume shrinkage has been conventionally solved by addition of inorganic fillers. However, addition of fillers to curable composition causes serious increase in its viscosity to make it less fluid. Moreover, the addition of fillers affects properties of the cured material (decrease in mechanical strength) and consequently has influence on the adhesion strength.

To solve the problem of volume shrinkage, it is opportune to add shrinkage suppressive monomers as co-monomers, which can undergo some reactions under the conditions for the curing reactions of epoxide. Such solutions are well known in the state of the art. Several compounds having cyclic ether structures have been claimed as shrinkage suppressive monomers in epoxy-cationic curing reactions. For example spiroketal compounds (SK) have been disclosed in JP2002128785 A2.

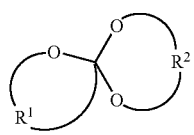

SK

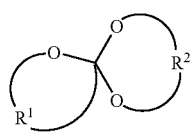

SOE

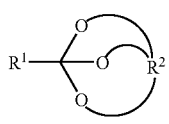

BOE

In a further publication Takata, T. and Endo, T. reveal spiroorthoester (SOE), and bicyclorothoester (BOE) as shrinkage suppressive monomers (in Polym. Prepr. Jpn., 1988, 37, 241). These monomers are designed so that they undergo cascading double ring opening reactions to create large free volume, compensating shrinkage of epoxy monomers upon curing reactions. However, the shrinkage suppressive effects by these compounds are still not sufficient. Some of the monomers require exhaustive multi-step syntheses with low yields, leading to high costs in utilization of these monomers. SOE is prepared by acid-catalyzed addition reaction of epoxide and lactone and the resulting crude mixture is used as a crude SOE, reducing cost for the monomer synthesis (JP59149924 A2 by Toshiba Corp., Japan). However, this method gives crude SOE contaminated with the acid catalyst, which seriously damage pot life of epoxy formulations containing the crude SOE.

Example of double ring opening reaction

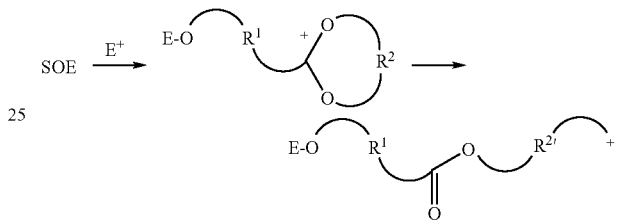

Besides the above mentioned cyclic ethers also lactones have been disclosed as shrinkage suppressive monomers. In WO2003076544 A1 and JP59199712 A2 aliphatic lactones are mentioned as shrinkage suppressive monomers. Also Spirobislactone (SBL) is known as a shrinkage suppressive monomer (J. Polym. Sci., Part A: Polym. Chem. 2005, 43(15), 3421-3432).

Nevertheless, the shrinkage suppression effects of those monomers were not satisfying.

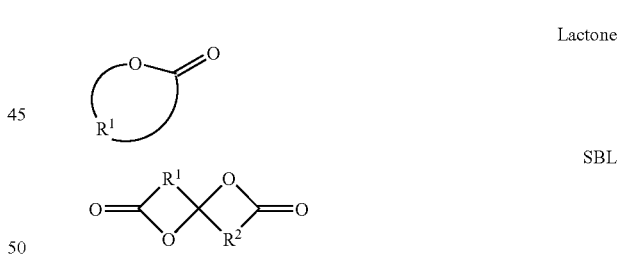

Despite the mentioned state of the art there remains a need for effective shrinkage suppression in cationic-cured epoxy compositions.

SUMMARY OF THE INVENTION

Subject of the present invention is a curable epoxy composition, comprising:

an epoxy resin;

a reagent selected from the group of cationic compounds or compounds which are capable to form cationic compounds or mixtures of those;

at least one compound with at least two aromatic centres, and at least one central cyclic oxygen bridged ring, connecting the at least two aromatic centres according to formula I:

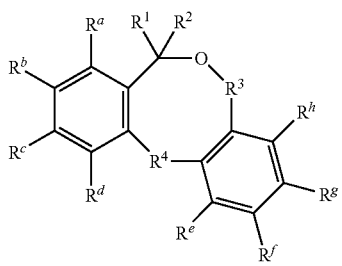

(I)

wherein $R^1$ and $R^2$ are independently from each other hydrogen or substituted or unsubstituted alkyl group with a chain length of 1 to 20, in particular 1 to 10 carbon atoms;

$R^a$ to $R^h$ are independently from each other selected from hydrogen, substituted or unsubstituted alkyl or aryl, substituted or unsubstituted alkoxy, or halogen, or two neighboured residues R selected from $R^a$ to $R^d$ and/or $R^e$ to $R^h$ form an additional aromatic ring;

$R^3$ is an alkyl bridge with a number of carbon atoms of 1, 2 or 3 which may be oxo-substituted; if the central cyclic oxygen bridged ring contains at least 7 atoms, $R^3$ can disappear resulting in a direct bonding between the oxygen and the aromatic ring next to the oxygen;

$R^4$ is selected from a substituted or unsubstituted alkyl bridge with a number of carbon atoms of 1, 2 or 3 which may be oxo-substituted and oxygen, and sulfur, and oxidated sulfur (=SO, $SO_2$) and nitrogen, substituted with hydrogen, substituted or unsubstituted alkyl or aryl or alkoxy, in the case of alkyl or alkoxy they have a preferred chain length of 1 to 20, in particular 1 to 10 carbon atoms;

if the central cyclic oxygen bridged ring contains at least 7 atoms, $R^4$ can disappear resulting in a direct bonding between the two aromatic rings In the case one or several of $R^a$ to $R^h$ are substituted or unsubstituted alkyl or substituted or unsubstituted alkoxy it is preferred that they have a chain length of 1 to 20, in particular 1 to 10 carbon atoms;

It is further preferred that $R^4$ is additionally substituted with substituted or unsubstituted alkyl, aryl or alkoxy groups, whereby in the case substituted or unsubstituted alkyl or alkoxy it is preferred that they have a chain length of 1 to 20, in particular 1 to 10 carbon atoms;

In this context it is clear that the curable epoxy composition according to the present invention is not necessarily a homogeneous formulation. E.g. the aromatic compound according to formula (I) may be mixed as fine powder into the formulation.

If the aromatic compound according to formula (I) is applied as fine powder, this powder may be produced in usual ways to achieve powders, e.g. by using a mortar or a mill.

But there is also any other method possible to achieve at the powder, e.g. by dissolving the aromatic compound according to formula (I) in a first solvent or mixture of solvents and adding the resulting solution into a second solvent or mixture of solvents to precipitate the compound (I).

If this method is used it is preferred to use as first solvent or mixture of solvents ether-type solvents such as diethyl ether and tetrahydrofuran, ester-type solvents such as ethyl acetate and butyl acetate, ketone-type solvent such as acetone and 2-butanone, amide-type solvents such as N,N-dimethylformamide and N-methylpyrolidone, halogenated hydrocarbon-type solvents such as chloroform and dichloromethane or mixtures of those, in particular the ketone-type and the ester-type solvents are used.

In regard to the second solvent the preferred options are water, alcohol-type solvents such as methanol and ethanol, hydrocarbons such as hexane and pentane or mixtures of those, in particular, the alcohol-type solvents are used.

In a preferred mode of the inventive composition at least one of the at least two aromatic centres in the at least one compound according to formula I is benzene or naphthene.

It is also preferred that the central cyclic oxygen bridged ring in said at least one compound according to formula I contains at least 7 atoms, in particular 7 atoms, whereas it is especially preferred that the at least one compound according to formula I is selected from the chemical components according to formula II, III, IV.

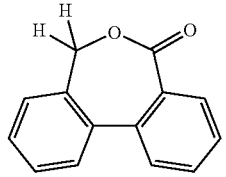

(II)

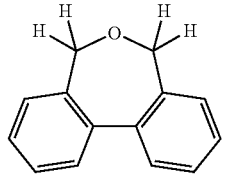

(III)

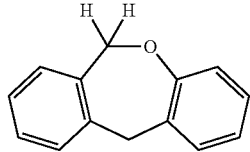

(IV)

Additionally the inventive composition comprises an epoxy resin.

In this context the invention is not limited to any specific epoxy component. In general all epoxy components used in curing epoxy compositions are suitable to be used in the compositions of the present invention.

Preferable examples of suitable epoxy components (II) are any common epoxy resin, a portion of which is a multifunctional epoxy resin, i.e. an epoxy resin with more than one, for instance two or more epoxy groups.

Examples of such epoxy resins include $C_4$-$C_{28}$ alkyl glycidyl ethers; $C_2$-$C_{28}$ alkyl- and alkenyl-glycidyl esters; $C_1$-$C_{28}$ alkyl-, mono- and poly-phenol glycidyl ethers; polyglycidyl ethers of pyrocatechol, resorcinol, hydroquinone, 4,4'-dihydroxydiphenyl methane (or bisphenol F, such as RE-404-S or RE-410-S available commercially from Nippon Kayuku, Japan), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphenyl)methane; polyglycidyl ethers of transition metal complex chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; N,N'-diglycidylaniline; N,N'-dimethyl-N,N'-diglycidyl-4,4'-diaminodiphenyl methane; N,N,N',N'-tetraglycidyl-4,4'-diaminodiphenyl methane; N,N'-diglycidyl-4-aminophenyl glycidyl ether; N,N,N',N'-tetraglycidyl-1,3-propylene bis-4-aminobenzoate; phenol novolac epoxy resin; cresol novolac epoxy resin; and combinations thereof.

Among the commercially available epoxy resins suitable for use herein are polyglycidyl derivatives of phenolic compounds, such as those available under the tradenames EPON 828, EPON 1001, EPON 1009, and EPON 1031, from Shell Chemical Co.; DER 331, DER 332, DER 334, and DER 542 from Dow Chemical Co.; GY285 from Ciba Specialty Chemicals, Tarrytown, N.Y.; and BREN-S from Nippon Kayaku, Japan. Other suitable epoxy resins include polyepoxides prepared from polyols and the like and polyglycidyl derivatives of phenol-form aldehyde novolacs, the latter of which are available commercially under the tradenames DEN 431, DEN 438, and DEN 439 from Dow Chemical Company. Cresol analogs are also available commercially ECN 1235, ECN 1273, and ECN 1299 from Ciba Specialty Chemicals. SU-8 is a bisphenol A-type epoxy novolac available from Shell Chemicals (formerly, Interez, Inc.). Polyglycidyl adducts of amines, aminoalcohols and polycarboxylic acids are also useful in this invention, commercially available resins of which include GLYAMINE 135, GLYAMINE 125, and GLYAMINE 115 from F.I.C. Corporation; ARALDITE MY-720, ARALDITE MY-721, ARALDITE 0500, and ARALDITE 0510 from Ciba Specialty Chemicals and PGA-X and PGA-C from the Sherwin-Williams Co. And of course combinations of the different epoxy resins are also desirable for use herein.

As noted above, the epoxy resin component of the present invention preferably includes any common epoxy resin, at least a portion of which is a multifunctional epoxy resin. Ordinarily, the multifunctional epoxy resin should be included in an amount within the range of preferably about 20 weight percent to preferably about 100 weight percent of the epoxy resin component.

A monofunctional epoxy resin, if present, should ordinarily be used as a reactive diluent, or crosslink density modifier. In the event such a monofunctional epoxy resin is included as a portion of the epoxy resin component, such resin should be employed in an amount of preferably up to about 20 weight percent, based on the total epoxy resin component.

Preferable epoxy compounds (II), can be exemplified by the following general formula:

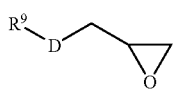 (V)

wherein D denotes an oxygen or

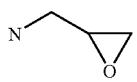

and $R^9$ is selected from the group consisting of a straight-chain or branched alkyl group with 1 to 18 carbon atoms; an aromatic or heteroaromatic group with 4 to 12 carbon atoms; a group with the structure

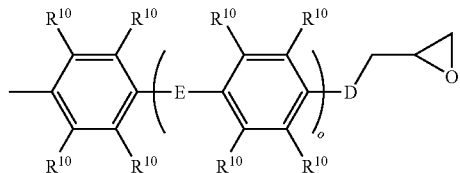

wherein all $R^{10}$ within the group are same or different and independently denote hydrogen or an alkyl group with 1 to 4 carbon atoms; and o is 0 or 1; and E is selected from the group consisting of a carbon-carbon single bond and $CR^{11}_2$ wherein $R^{11}$ is same or different and independently denotes hydrogen or an alkyl group with 1 to 4 carbon atoms; and D is

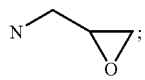

or $R^9$ is a group with the structure $R^{12}$—$SiR^{13}R^{14}R^{15}$ wherein $R^{13}$ and $R^{14}$ are the same or different, each of which denotes a straight-chain or branched alkoxy residue with 1 to 6 carbon atoms or an aryloxy or aralkyloxy residue, $R^{15}$ is different or the same as $R^{13}$ or $R^{14}$ or an aliphatic residue, an amino residue, a halogen residue, an aromatic or heteroaromatic residue, or an araliphatic or heteroaraliphatic residue, $R^{12}$ is a bridging group selected from the groups consisting of aliphatic, heteroaliphatic, araliphatic, heteroaraliphatic, aromatic and heteroaromatic groups.

Preferably $R^{13}$, $R^{14}$ and $R^{15}$ are the same or different, and each independently denotes a straight-chain or branched alkoxy residue with 1 to 4 carbon atoms, most preferably a methoxy or ethoxy residue. $R^{12}$ is preferably an alkylene chain with 1 to 6 carbon atoms, more preferably 2 to 4 carbon atoms, and most preferably a propylene group.

In case $R^9$ is a group with the structure $R^{12}$—$SiR^{13}R^{14}R^{15}$, at least two residues selected from $R^{13}$, $R^{14}$ and $R^{15}$ are apt to hydrolyze upon contact with moisture and therefore may form polycondensates.

Examples of such compounds are shown in Scheme 1. Oligomers of these compounds having residual epoxide groups, e.g., oligomers prepared by thermal or ionic oligomerization, by addition reaction with thiol, by addition reaction with carboxylic acid, by addition with carboxylic anhydride, and by addition reaction with amine, can be similarly used.

Scheme 1

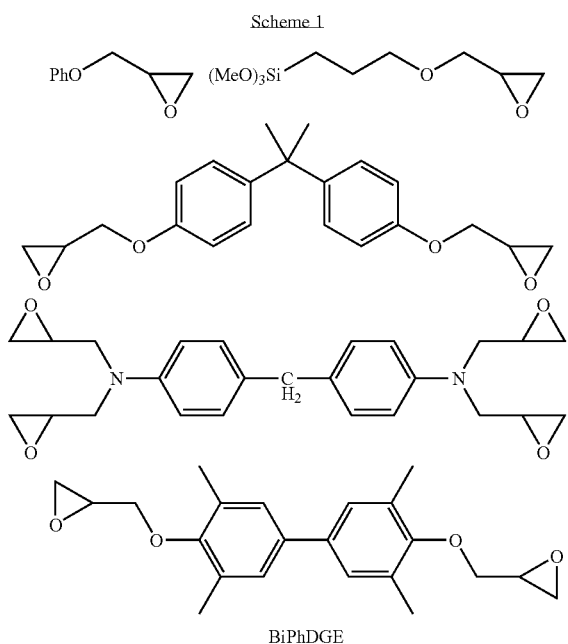

BiPhDGE

In one further mode of the present inventive composition said epoxy resin comprises 20% by weight to 100% by weight, based on the total epoxy component, of a multifunctional epoxy resin and up to 50% by weight of a monofunctional epoxy resin.

It is also preferred, that said reagent in the composition according to the present invention which is selected from the group of cationic compounds or compounds which are capable to form cationic compounds or mixtures of those is selected from the groups of Bronsted acids, preferrably sulfonic acids like trifluoromethane sulfonic acid, p-toluene sulfonic acid, camphor sulfonic acid Lewis acids, preferrably metal halides like $BX_3$, $AlX_3$, $PX_5$, $TiX_4$, $FeX_3$, $ZnX_2$, $SnX_4$, where X is selected from F, Cl, Br, and I Alkylating reagent preferably alkyl esters of the above mentioned Bronsted acid and alkyl halides such as methyl iodide, benzyl bromide, and allyl bromide Silylating reagent, preferably silyl esters of the above mentioned Bronsted acid, like trifluoromethane sulfonic acid trimethylsilyl ester Onium salts, preferably those selected from the groups of phosphonium salts $R_4P^+Y^-$, sulfonium salt $R_3S^+Y^-$, and iodonium salt $R_2I^+Y^-$ where R is preferrably selected from any alkyl groups and aryl groups, and $Y^-$ is preferrably selected from $BF_4^-$, $PF_6^-$, and $SbF_6^-$ Furtheron it is preferred, that in the composition according to the present invention the molar ratio between said epoxy resin and said reagent selected from the group of cationic compounds or compounds which are capable to form cationic compounds is in the range from 4 to 10000, more preferably 50 to 1000.

Besides this it is preferred, that in the composition according to the present invention the molar ratio between said epoxy resin and said at least one aromatic compound according to formula (I) is in the range from 0.5 to 100, more preferably 2 to 20.

It is also possible that the composition according to the present invention comprises any further usual or unusual ingredients, in particular additional components selected from the groups of inorganic fillers preferably silica powder, powdery metal oxide, and powdery metal or organic fillers preferably rubber particle and other polymer particles are preferred.

A further object of this invention is a copolymerization product achievable by curing of a composition according to the present invention, wherein the range of curing temperature is from 0° C. to 250° C., more preferable from 100° C. to 200° C.

Another object of the present invention is the use of at least one compound with at least two aromatic centres and at least one central cyclic oxygen bridged ring, connecting the at least two aromatic centres according to formula I:

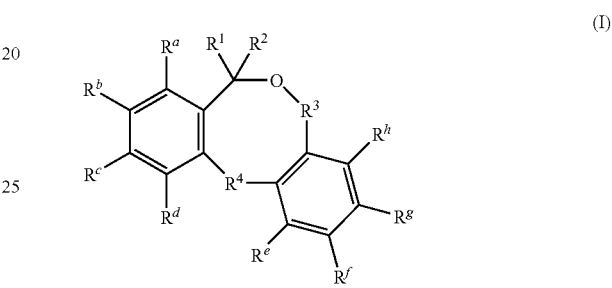

(I)

wherein $R^1$ and $R^2$ are independently from each other hydrogen or substituted or unsubstituted alkyl group with a chain length of 1 to 20, in particular 1 to 10 carbon atoms;

$R^a$ to $R^h$ are independently from each other selected from hydrogen, substituted or unsubstituted alkyl or aryl, substituted or unsubstituted alkoxy, or halogen, or two neighboured residues R selected from $R^a$ to $R^d$ and/or $R^e$ to $R^h$ form an additional aromatic ring;

$R^3$ is an alkyl bridge with a number of carbon atoms of 1, 2 or 3 which may be oxo-substituted; if the central cyclic oxygen bridged ring contains at least 7 atoms, $R^3$ can disappear resulting in a direct bonding between the oxygen and the aromatic ring next to the oxygen;

$R^4$ is selected from
  a substituted or unsubstituted alkyl bridge with a number of carbon atoms of 1, 2 or 3 which may be oxo-substituted and
  oxygen, and
  sulfur, and oxidated sulfur (=SO, $SO_2$) and
  nitrogen, substituted with hydrogen, substituted or unsubstituted alkyl or aryl or alkoxy, in the case of alkyl or alkoxy they have a preferred chain length of 1 to 20, in particular 1 to 10 carbon atoms;
  if the central cyclic oxygen bridged ring contains at least 7 atoms, $R^4$ can disappear resulting in a direct bonding between the two aromatic rings as shrinkage-suppressing agent in a curable epoxy composition comprising:

an epoxy resin and a reagent selected from the group of cationic compounds or compounds which are capable to form cationic compounds or mixtures of those;

In the case one or several of $R^a$ to $R^h$ are substituted or unsubstituted alkyl or substituted or unsubstituted alkoxy it is preferred that they have a chain length of 1 to 20, in particular 1 to 10 carbon atoms;

It is further preferred that $R^4$ is additionally substituted with substituted or unsubstituted alkyl, aryl or alkoxy groups, whereby in the case substituted or unsubstituted alkyl or alkoxy it is preferred that they have a chain length of 1 to 20, in particular 1 to 10 carbon atoms;

In a preferred mode of the inventive use at least one of the at least two aromatic centres in the at least one compound according to formula I is benzene or naphthene.

It is also preferred that the central cyclic oxygen bridged ring in said at least one compound according to formula I contains at least 7 atoms, in particular 7 atoms, whereas it is especially preferred that the at least one compound according to formula I is selected from the chemical components according to formula II, III, IV.

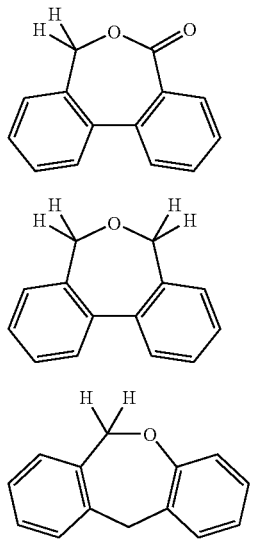

As explained the inventive use according to the present invention is directed to compositions comprising an epoxy resin.

Preferred examples of suitable epoxy resins are any common epoxy resin, a portion of which is a multifunctional epoxy resin, i.e. an epoxy resin with more than one, for instance two or more epoxy groups.

Examples of such epoxy resins include $C_4$-$C_{28}$ alkyl glycidyl ethers; $C_2$-$C_{28}$ alkyl- and alkenyl-glycidyl esters; $C_1$-$C_{28}$ alkyl-, mono- and poly-phenol glycidyl ethers; polyglycidyl ethers of pyrocatechol, resorcinol, hydroquinone, 4,4'-dihydroxydiphenyl methane (or bisphenol F, such as RE-404-S or RE-410-S available commercially from Nippon Kayuku, Japan), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphenyl)methane; polyglycidyl ethers of transition metal complex chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms; N,N'-diglycidylaniline; N,N'-dimethyl-N,N'-diglycidyl-4,4'-diaminodiphenyl methane; N,N,N',N'-tetraglycidyl-4,4'-diaminodiphenyl methane; N,N'-diglycidyl-4-aminophenyl glycidyl ether; N,N,N',N'-tetraglycidyl-1,3-propylene bis-4-aminobenzoate; phenol novolac epoxy resin; cresol novolac epoxy resin; and combinations thereof.

Among the commercially available epoxy resins suitable for use herein are polyglycidyl derivatives of phenolic compounds, such as those available under the tradenames EPON 828, EPON 1001, EPON 1009, and EPON 1031, from Shell Chemical Co.; DER 331, DER 332, DER 334, and DER 542 from Dow Chemical Co.; GY285 from Ciba Specialty Chemicals, Tarrytown, N.Y.; and BREN-S from Nippon Kayaku, Japan. Other suitable epoxy resins include polyepoxides prepared from polyols and the like and polyglycidyl derivatives of phenol-formaldehyde novolacs, the latter of which are available commercially under the tradenames DEN 431, DEN 438, and DEN 439 from Dow Chemical Company. Cresol analogs are also available commercially ECN 1235, ECN 1273, and ECN 1299 from Ciba Specialty Chemicals. SU-8 is a bisphenol A-type epoxy novolac available from Shell Chemicals (formerly, Interez, Inc.). Polyglycidyl adducts of amines, aminoalcohols and polycarboxylic acids are also useful in this invention, commercially available resins of which include GLYAMINE 135, GLYAMINE 125, and GLYAMINE 115 from F.I.C. Corporation; ARALDITE MY-720, ARALDITE MY-721, ARALDITE 0500, and ARALDITE 0510 from Ciba Specialty Chemicals and PGA-X and PGA-C from the Sherwin-Williams Co. And of course combinations of the different epoxy resins are also desirable for use herein.

As noted above, the epoxy resin component in the inventive use according the present invention preferably includes any common epoxy resin, at least a portion of which is a multifunctional epoxy resin. Ordinarily, the multifunctional epoxy resin should be included in an amount within the range of preferably about 20 weight percent to preferably about 100 weight percent of the epoxy resin component.

A monofunctional epoxy resin, if present, should ordinarily be used as a reactive diluent, or crosslink density modifier. In the event such a monofunctional epoxy resin is included as a portion of the epoxy resin component, such resin should be employed in an amount of preferably up to about 20 weight percent, based on the total epoxy resin component.

Preferable epoxy compounds (II), can be exemplified by the following general formula:

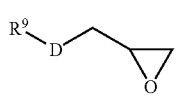

wherein D denotes an oxygen or

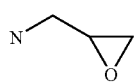

and R⁹ is selected from the group consisting of a straight-chain or branched alkyl group with 1 to 18 carbon atoms; an aromatic or heteroaromatic group with 4 to 12 carbon atoms; a group with the structure

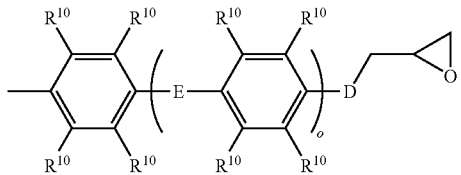

wherein all $R^{10}$ within the group are same or different and independently denote hydrogen or an alkyl group with 1 to 4 carbon atoms; and o is 0 or 1; and E is selected from the group consisting of a carbon-carbon single bond and $CR^{11}_2$ wherein $R^{11}$ is same or different and independently denotes hydrogen or an alkyl group with 1 to 4 carbon atoms; and D is

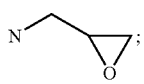

or

R⁹ is a group with the structure $R^{12}$—$SiR^{13}R^{14}R^{15}$ wherein $R^{13}$ and $R^{14}$ are the same or different, each of which denotes a straight-chain or branched alkoxy residue with 1 to 6 carbon atoms or an aryloxy or aralkyloxy residue, $R^{15}$ is different or the same as $R^{13}$ or $R^{14}$ or an aliphatic residue, an amino residue, a halogen residue, an aromatic or heteroaromatic residue, or an araliphatic or heteroaraliphatic residue, $R^{12}$ is a bridging group selected from the groups consisting of aliphatic, heteroaliphatic, araliphatic, heteroaraliphatic, aromatic and heteroaromatic groups.

Preferably $R^{13}$, $R^{14}$ and $R^{15}$ are the same or different, and each independently denotes a straight-chain or branched alkoxy residue with 1 to 4 carbon atoms, most preferably a methoxy or ethoxy residue. $R^{12}$ is preferably an alkylene chain with 1 to 6 carbon atoms, more preferably 2 to 4 carbon atoms, and most preferably a propylene group.

In case R⁹ is a group with the structure $R^{12}$—$SiR^{13}R^{14}R^{15}$, at least two residues selected from $R^{13}$, $R^{14}$ and $R^{15}$ are apt to hydrolyze upon contact with moisture and therefore may form polycondensates.

Examples of such compounds are shown in Scheme 1. Oligomers of these compounds having residual epoxide groups, e.g., oligomers prepared by thermal or ionic oligomerization, by addition reaction with thiol, by addition reaction with carboxylic acid, by addition with carboxylic anhydride, and by addition reaction with amine, can be similarly used.

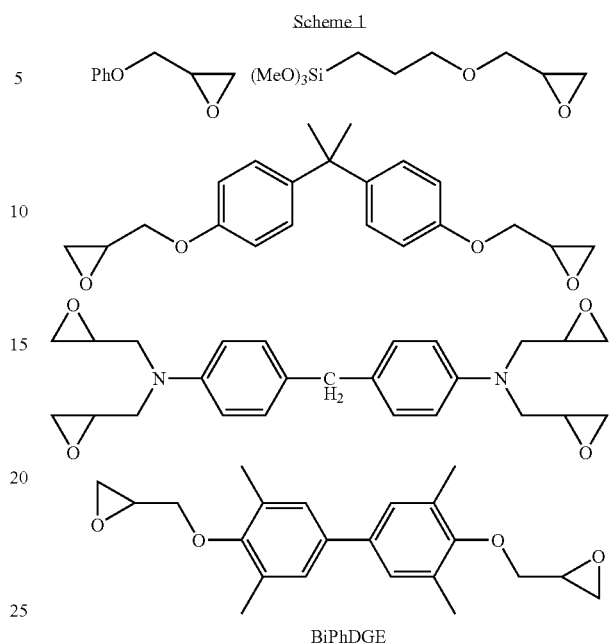

In one further mode of the present inventive use said epoxy resin comprises 20% by weight to 100% by weight, based on the total epoxy component, of a multifunctional epoxy resin and up to 50% by weight of a monofunctional epoxy resin.

It is also preferred for the inventive use, that said reagent in the use according to the present invention which is selected from the group of cationic compounds or compounds which are capable to form cationic compounds or mixtures of those is selected from the groups of Bronsted acids, preferrably sulfonic acids like trifluoromethane sulfonic acid, p-toluene sulfonic acid, camphor sulfonic acid Lewis acids, preferrably metal halides like $BX_3$, $AlX_3$, $PX_5$, $TiX_4$, $FeX_3$, $ZnX_2$, $SnX_4$, where X is selected from F, Cl, Br, and I Alkylating reagent preferably alkyl esters of the above mentioned Bronsted acid and alkyl halides such as methyl iodide, benzyl bromide, and allyl bromide Silylating reagent, preferably silyl esters of the above mentioned Bronsted acid, like trifluoromethane sulfonic acid trimethylsilyl ester Onium salts, preferably those selected from the groups of phosphonium salts $R_4P^+Y^-$, sulfonium salt $R_3S^+Y^-$, and iodonium salt $R_2I^+Y^-$ where R is preferrably selected from any alkyl groups and aryl groups, and $Y^-$ is preferrably selected from $BF_4^-$, $PF_6^-$, and $SbF_6^-$ Furtheron it is preferred, that in the use according to the present invention the molar ratio between said epoxy resin and said reagent selected from the group of cationic compounds or compounds which are capable to form cationic compounds is in the range from 4 to 100001 more preferably 50 to 1000.

Besides this it is preferred, that in the use according to the present invention the molar ratio between said epoxy resin and said at least one aromatic compound according to formula (I) is in the range from 0.5 to 100, more preferably 2 to 20.

It is also possible that in the use according to the present invention there are involved further usual or unusual ingredients, in particular additional components selected from the groups of inorganic fillers preferably silica powder, powdery metal oxide, and powdery metal or organic fillers preferably rubber particle and other polymer particles are preferred.

The present invention further provides the use of the curable compositions of the present invention or a copolymerisate achievable from said compositions in or as for instance sealants, adhesives and coatings, preferably in electronic chip bonding and electronic chip underfills.

Suitable substrates on which the compositions or the sealants, adhesives and/or coatings comprising said compositions are applied are metals such as steel, aluminum, titanium, magnesium, brass, stainless steel, galvanized steel, like HDG-steel and EG-steel; silicates such as glass and quartz; metal oxides; concrete; wood; electronic chip material, for instance semiconductor chip material; or polymers such as polyimide films and polycarbonate.

The present invention is exemplified in more detail by means of Examples, which follow below.

The present invention is exemplified in more detail by means of Examples, which follow below.

EXAMPLES

Raw Materials for Experiments

Dibenzooxepinone (abbreviation: DBOX=chemical structure can be seen in the reaction scheme below) was synthesized according to the method reported by Volker Brandmeier and Martin Feigel in Tetrahedron, 1989, 45, 1365.

6,7-Dihydro-5H-dibenz[c,e]oxepin (abbreviation: DHDBOX=chemical structure can be seen in the reaction scheme below) was synthesized according to the method reported by Ugo Azzenda, Salvatore Demartis, Luciano Pilo, and Elisabetta Piras in Tetrahedron, 2000, 56, 8375.

1. Curing Reactions of Epoxy Formulations Containing Bisphenol F-Type Epoxy Resin (Bis F-DGE: Stands for Bisphenol F Digycidylether=Chemical Structure can be Seen in the Reaction Scheme Below).

Example 1-1

Preparation of the Curable Formulation

Bis F-DGE (8.00 g, 25.6 mmol, amount of epoxy group=51.2 mmol), DBOX (2.52 g, 12.0 mmol), and benzopinacol (25 mg) were mixed at 110° C. and degassed under vacuum to obtain a homogeneous mixture. After cooling to ambient temperature, HD7980 (diaryliodonium hexafluorophosphate 50 mg) was added to this mixture to give the corresponding curable formulation as homogeneous liquid A.

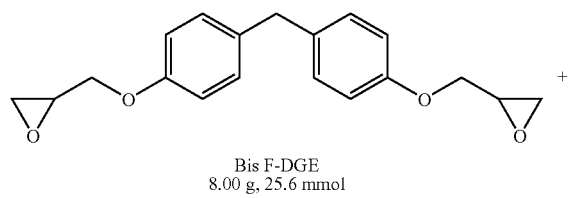

Bis F-DGE
8.00 g, 25.6 mmol

-continued

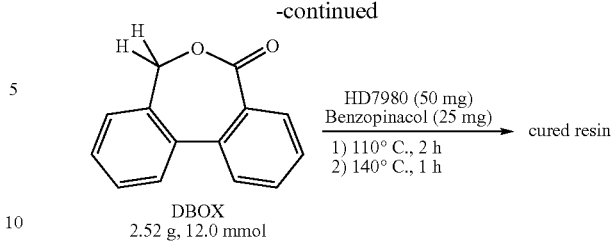

DBOX
2.52 g, 12.0 mmol

HD7980 (50 mg)
Benzopinacol (25 mg)
1) 110° C., 2 h
2) 140° C., 1 h
→ cured resin Curing Reaction and Shrinkage Test Approximately 5 g of the obtained mixture A was used to measure its volume by gas-pychnometer. From the weight and the volume of the sample, its density before curing ($=D_{before\ curing}$) was calculated. Three independent samples were used for the test, and each sample was tested 5 times to calculate the average density ($D_{before\ curing}$). The calculated $D_{before\ curing}$ was 1.216. Then, the mixture was transferred into a silicone mold, and was cured at 110° C. for 2 h followed by post cure at 140° C. for 1 h, to obtain a cylinder-shaped cured resin, of which average density ($D_{after\ curing}$; as above: average of 15 times measurement) was measured by gas-pychnometer. Based on the two density values, the degree of volume change was calculated to be 2.1%, according to the equation:

$$\text{Degree of volume change}[\%] = [(D_{before\ curing})/(D_{after\ curing}) - 1] \times 100$$

Temperature for 10% weight loss ($Td_{10}$) by thermal degradation of the cured material and its glass transition temperature (Tg) were measured by thermogravimetric analysis (TG) and differential scanning calorimetric analysis, respectively.

The corresponding data are shown in Table 1.

Example 1-1-a

Preparation of the Curable Formulation

Powdery DBOX (2.00 g, 9.51 mmol) was dispersed in Bis F-DGE (8.00 g, 25.6 mmol, amount of epoxy group=51.2 mmol). To the resulting DBOX/Bis F-DGE dispersion benzopinacol (25 mg) and HD7980 (diaryliodonium hexafluorophosphate 50 mg) were added to obtain a heterogeneous formulation which was cured under the same conditions as were used in example 1-1.

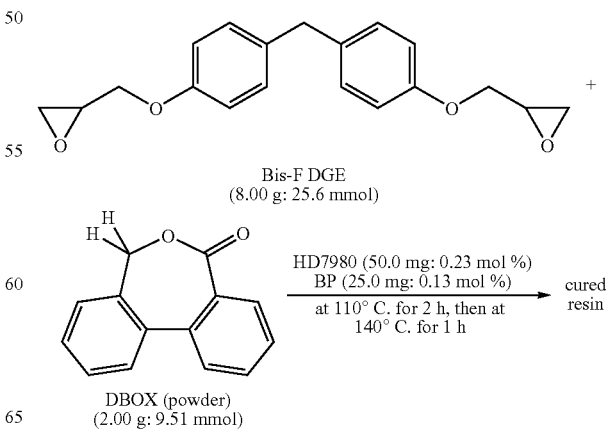

Bis-F DGE
(8.00 g: 25.6 mmol)

DBOX (powder)
(2.00 g: 9.51 mmol)

HD7980 (50.0 mg: 0.23 mol %)
BP (25.0 mg: 0.13 mol %)
at 110° C. for 2 h, then at
140° C. for 1 h
→ cured resin Curing reaction and shrinkage test were performed in the same way as for example 1-1.

As can be seen in Table 1, there was no difference in the shrinkage degree between the example 1-1-a and example 1-1, showing that addition of powdery DBOX without effort to dissolve it into epoxy resins is also effective to suppress their volume shrinkages.

Example 1-1-b

Preparation of the Curable Formulation

Powdery DBOX (2.00 g, 9.51 mmol) and silica filler FL1966 (10.0 g) were dispersed in a mixture of F-DGE (8.00 g, 25.6 mmol, amount of epoxy group=51.2 mmol), benzopinacol (25 mg) and HD7980 (diaryliodonium hexafluorophosphate 50 mg). The resulting heterogeneous formulation was cured under the same conditions as were used in example 1-1.

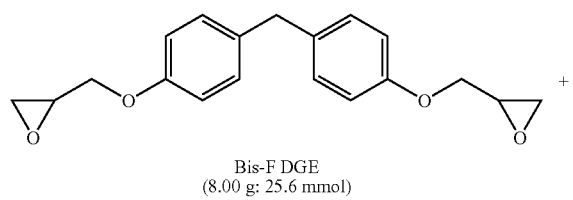

Bis-F DGE
(8.00 g: 25.6 mmol)

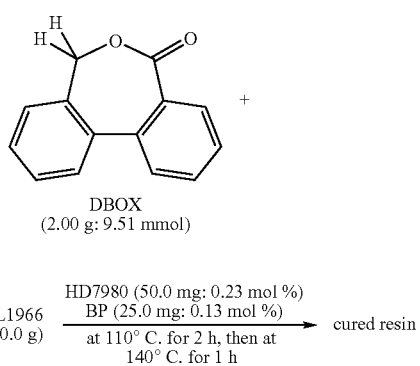

DBOX
(2.00 g: 9.51 mmol)

FL1966 (10.0 g) + HD7980 (50.0 mg: 0.23 mol %) + BP (25.0 mg: 0.13 mol %) at 110° C. for 2 h, then at 140° C. for 1 h → cured resin Curing reaction and shrinkage test were performed in the same way as for example 1-1.

Example 1-2

Instead of DBOX in Example 1-1, a 7-membered cyclic ether, DHDBOX, was used as a comonomer. All further parameters were identical to Example 1-1

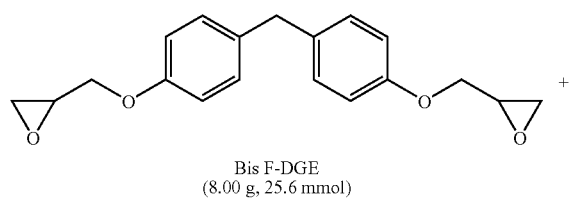

Bis F-DGE
(8.00 g, 25.6 mmol)

-continued

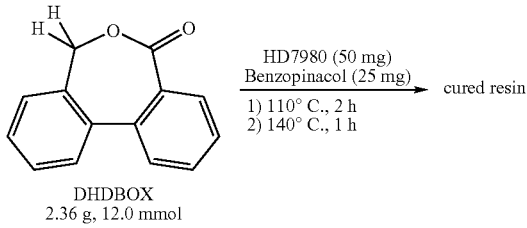

DHDBOX
2.36 g, 12.0 mmol

HD7980 (50 mg)
Benzopinacol (25 mg)
1) 110° C., 2 h
2) 140° C., 1 h
→ cured resin Comparative Example 1-1

In a first comparative example the curing reaction of Bis F-DGE was carried out without addition of the 7-membered cyclic ether, DHDBOX as comonomer.

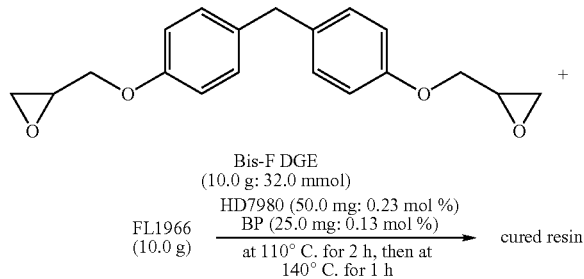

Bis F-DGE
(15.0 g, 48.0 mmol)

HD7980 (94 mg)
Benzopinacol (47 mg)
1) 110° C., 2 h
2) 140° C., 1 h
→ cured resin Comparative Example 1-1-b In this comparative example the same curing reaction of Bis F-DGE as in example 1-1-b was carried out without addition of powdered DBOX as comonomer.

Bis-F DGE
(10.0 g: 32.0 mmol)

FL1966 (10.0 g) + HD7980 (50.0 mg: 0.23 mol %) + BP (25.0 mg: 0.13 mol %) at 110° C. for 2 h, then at 140° C. for 1 h → cured resin Comparative Example 1-2

In a second comparative example another comonomer, glycidyl phenyl ether (GPE) was used. It was used in the same molar amount as DHDBOX in Example 1-2 (12 mmol).

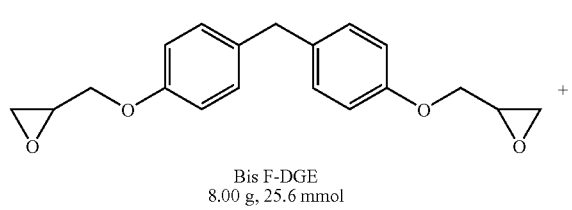

Bis F-DGE
8.00 g, 25.6 mmol

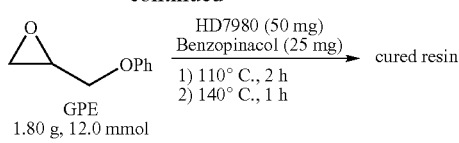

GPE
1.80 g, 12.0 mmol

Comparative Example 1-3

In a third comparative example again another comonomer, □-caprolactone (CL) was used. It also was used in the same molar amount as DHDBOX in Example 1-2 (12 mmol).

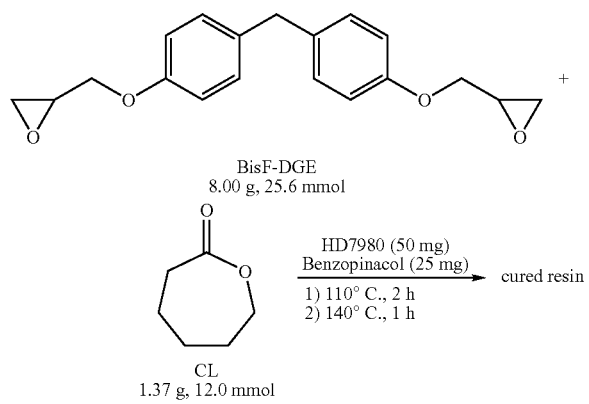

Comparative Example 1-4

In a fourth comparative example again another comonomer, spirobislactone (SBL) was used. It also was used in the same molar amount as DHDBOX in Example 1-2 (12 mmol).

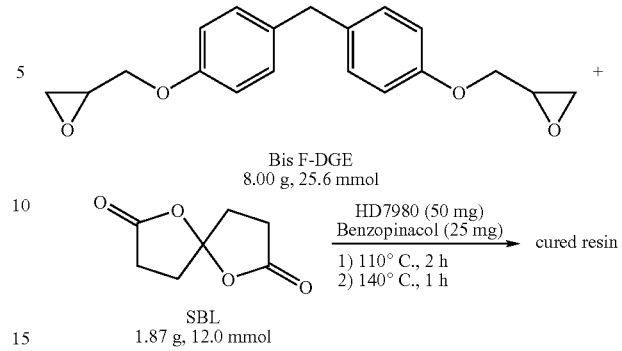

Comparative Example 1-5

In a fifth comparative example again another comonomer, 3-isochromanone (ICM) was used. It also was used in the same molar amount as DHDBOX in Example 1-2 (12 mmol).

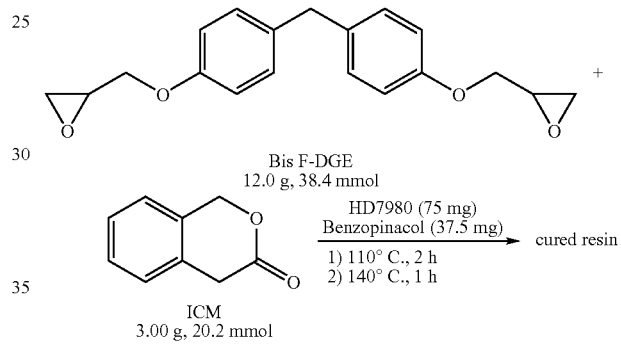

All the results according to the above mentioned examples are summarized in the following table 1.

TABLE 1

Comonomers and their shrinkage suppression effects

| | Comonomer | density (g/cm$^3$) before curing | density (g/cm$^3$) after curing | shrinkage (%) | T$_{d10}$ (° C.) | T$_g$ (° C.) |
|---|---|---|---|---|---|---|
| Example 1-1 | DBOX | 1.216 | 1.242 | 2.1 | 334 | 53 |
| Example 1-1-a | DBOX (powder) | | | 2.1 | | |
| Example 1-1-b | DBOX (powder) | 1.573 | 1.619 | 2.8 | 377 | 129 |
| Example 1-2 | DHDBOX | 1.191 | 1.226 | 2.9 | 320 | 75 |
| Comparative Example 1-1 | — | 1.190 | 1.234 | 3.6 | 389 | 92 |
| Comparative Example 1-1-b | — | 1.557 | 1.616 | 3.6 | 374 | 99 |
| Comparative Example 1-2 | GPE | 1.174 | 1.228 | 4.5 | 394 | 65 |
| Comparative Example 1-3 | CL | 1.178 | 1.225 | 3.8 | 364 | 95 |
| Comparative Example 1-4 | SBL | 1.220 | 1.262 | 3.3 | 354 | 105 |
| Comparative Example 1-5 | ICM | 1.198 | 1.241 | 3.5 | 381 | 77 |

As can be seen from the results compiled in Table 1 the examples according to the present invention showed good effects in regard to shrinkage suppression which were superior to the comparative samples.

2. Curing Reactions of Epoxy Formulations Containing Bisphenol A-Type Epoxy Resin (Bis A-DGE: Stands for Bisphenol A Digycidylether=Chemical Structure can be Seen in the Reaction Scheme Below).

Curing reactions and tests were done in the same manner and according to the same method as already explained for Example 1-1. The corresponding data are shown in Table 2.

Example 2-1

Bis A-DGE was used as an epoxy resin instead of Bis F-DGE in Example 1-1. DBOX was used as a comonomer. All further criteria were identical to those in Example 1-1. The molar amounts of the different compounds can be seen from the reaction scheme below.

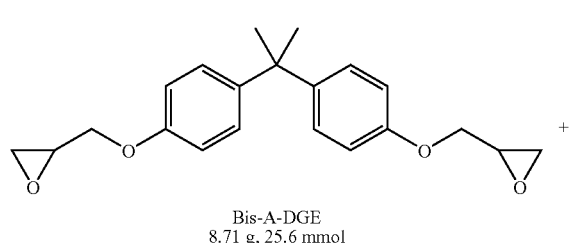

Bis-A-DGE
8.71 g, 25.6 mmol

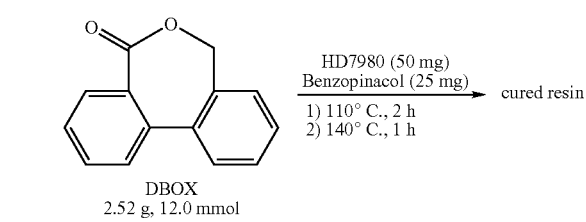

DBOX
2.52 g, 12.0 mmol

HD7980 (50 mg)
Benzopinacol (25 mg)
1) 110° C., 2 h
2) 140° C., 1 h
→ cured resin

Example 2-2

A mixture of Bis A-DGE and glycidyl phenyl ether GPE was used as an epoxy part. DBOX was added as a comonomer for shrinkage suppression. The molar amounts of the different compounds can be seen from the reaction scheme below.

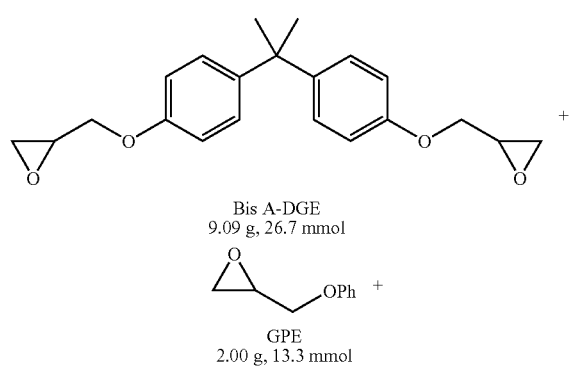

Bis A-DGE
9.09 g, 26.7 mmol

GPE
2.00 g, 13.3 mmol

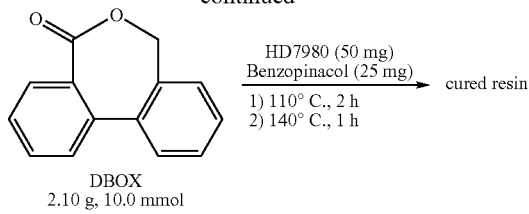

DBOX
2.10 g, 10.0 mmol

HD7980 (50 mg)
Benzopinacol (25 mg)
1) 110° C., 2 h
2) 140° C., 1 h
→ cured resin

Comparative Example 2-1

In a first comparative example another comonomer, glycidyl phenyl ether (GPE) was used. It was used in the same molar amount as DBOX in Example 2-1 (12 mmol).

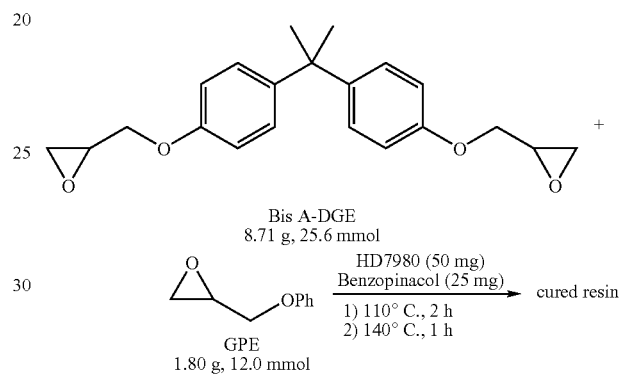

Bis A-DGE
8.71 g, 25.6 mmol

GPE
1.80 g, 12.0 mmol

HD7980 (50 mg)
Benzopinacol (25 mg)
1) 110° C., 2 h
2) 140° C., 1 h
→ cured resin

Comparative Example 2-2

In a second comparative example a higher amount of glycidyl phenyl ether (GPE) was used in comparison with comparative example 2-2 (23.3 mmol).

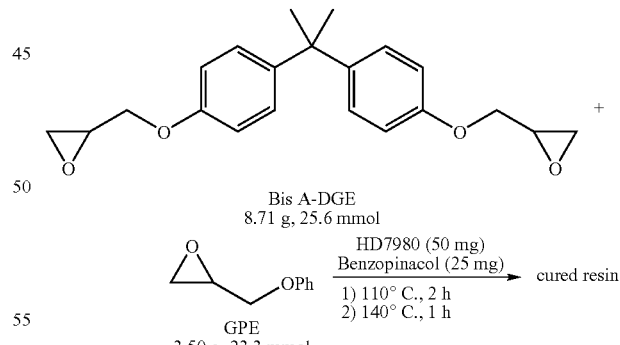

Bis A-DGE
8.71 g, 25.6 mmol

GPE
3.50 g, 23.3 mmol

HD7980 (50 mg)
Benzopinacol (25 mg)
1) 110° C., 2 h
2) 140° C., 1 h
→ cured resin

TABLE 2

| | comonomer | density (g/cm$^3$) before curing | density (g/cm$^3$) after curing | shrinkage (%) | $T_{d10}$ (° C.) | Tg (° C.) |
|---|---|---|---|---|---|---|
| Example 2-1 | DBOX | 1.191 | 1.211 | 1.6 | 330 | 87 |
| Example 2-2 | DBOX | 1.186 | 1.219 | 2.7 | 324 | 72 |

TABLE 2-continued

| | comonomer | density (g/cm³) before curing | density (g/cm³) after curing | shrinkage (%) | $T_{d10}$ (° C.) | Tg (° C.) |
|---|---|---|---|---|---|---|
| Comparative Example 2-1 | GPE | 1.162 | 1.203 | 3.4 | 338 | 69 |
| Comparative Example 2-2 | GPE | 1.152 | 1.206 | 4.5 | 300 | 56 |

As can be seen from the results compiled in Table 2 the examples according to the present invention showed good effects in regard to shrinkage suppression which were superior to the comparative examples.

Example 3-1

Preparation of the Curable Formulation

Bis F-DGE (8.17 g, 26.2 mmol, amount of epoxy group=52.4 mmol), DBOX (2.52 g, 12.0 mmol) were mixed at 110° C. and degassed under vacuum to obtain a homogeneous mixture. After cooling to ambient temperature, instead of HD7980 according to example 1-1, 50 mg of a sulfonium salt according to the formula shown in the reaction scheme below was added to this mixture to give the corresponding curable formulation as homogeneous liquid.

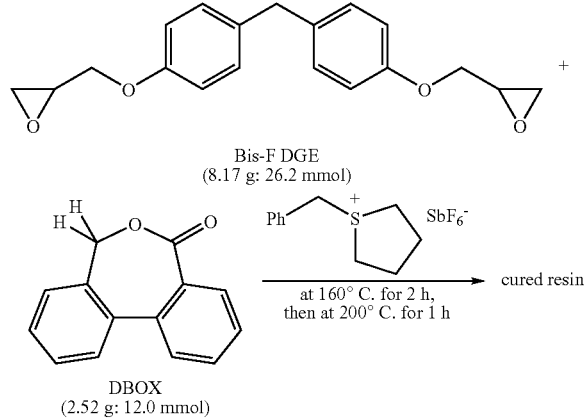

Curing Reaction and Shrinkage Test

Approximately 5 g of the obtained liquid was used to measure its volume by gas-pychnometer. From the weight and the volume of the sample, its density before curing (=$D_{before\ curing}$) was calculated. Three independent samples were used for the test, and each sample was tested 5 times to calculate the average density ($D_{before\ curing}$). Then, the mixture was transferred into a silicone mold, and was cured at 160° C. for 2 h followed by post cure at 200° C. for 1 h, to obtain a cylinder-shaped cured resin, of which average density ($D_{after\ curing}$; as above: average of 15 times measurement) was measured by gas-pychnometer. Based on the two density values, the degree of volume change was calculated to be 2.1%, according to the equation:

Degree of volume change[%]=[($D_{before\ curing}$)/($D_{after\ curing}$)−1]×100

Temperature for 10% weight loss ($Td_{10}$) by thermal degradation of the cured material and its glass transition temperature (Tg) were measured by thermogravimetric analysis (TG) and differential scanning calorimetric analysis, respectively. The corresponding data are shown in Table 3.

Comparative Example 3-1

Instead of DBOX in the example 3-1, the same molar amount of GPE was used. The results are also shown in Table 3.

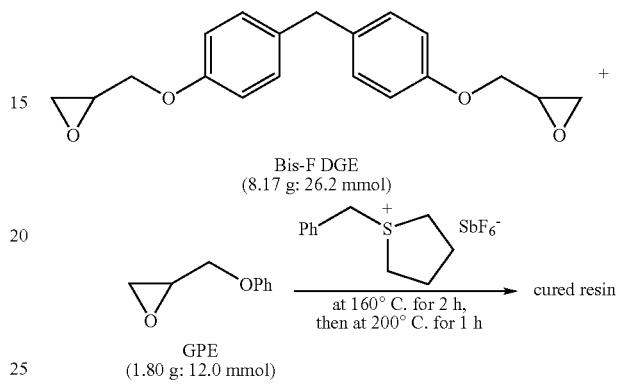

TABLE 3

| | comonomer | density (g/cm³) before curing | density (g/cm³) after curing | shrinkage (%) | $T_{d10}$ (° C.) | Tg (° C.) |
|---|---|---|---|---|---|---|
| Example 3 | DBOX | 1.226 | 1.242 | 2.1 | 360 | 124 |
| Comparative Example 3 | GPE | 1.200 | 1.245 | 3.6 | 391 | 113 |

The invention claimed is:

1. A curable epoxy composition comprising:
   an epoxy resin;
   a reagent selected from the group consisting of cationic compounds, compounds which are capable of forming cationic compounds, and mixtures thereof; and
   at least one compound with two aromatic centres and a central cyclic oxygen bridged ring, connecting the two aromatic centres according to formula I:

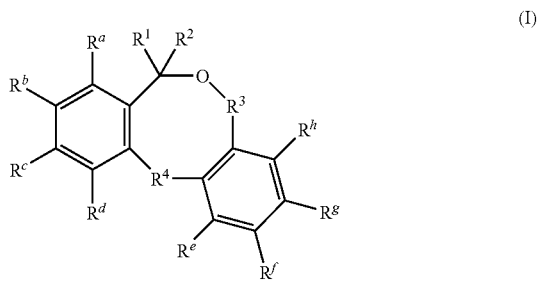

wherein
   $R^1$ and $R^2$ are independently selected from the group consisting of hydrogen, a substituted alkyl group with a chain length of 1 to 20 carbon atoms, and an unsubstituted alkyl group with a chain length of 1 to 20 carbon atoms;

R$^a$ to R$^h$ are independently selected from the group consisting of hydrogen, a substituted alkyl group, an unsubstituted alkyl group, a substituted aryl group, an unsubstituted aryl group, a substituted alkoxy group, an unsubstituted alkoxy group, halogen, and an additional aromatic ring formed by two adjacent R$^a$ to R$^h$ moieties;

R$^3$ is selected from the group consisting of an alkyl bridge with 1-3 carbon atoms, an oxo-substituted alkyl bridge with 1-3 carbon atoms, and a direct bond between the oxygen and the adjacent aromatic ring; wherein R$^3$ can be said direct bond, so long as the central cyclic oxygen bridged ring contains at least 7 atoms; and R$^4$ is selected from the group consisting of:
a substituted alkyl bridge with 1-3 carbon atoms, an unsubstituted alkyl bridge with 1-3 carbon atoms, an oxo-substituted alkyl bridge with 1-3 carbon atoms, oxygen, sulfur, oxidated sulfur (=SO, SO$_2$), nitrogen, nitrogen bonded to hydrogen, nitrogen bonded to a substituted alkyl group, nitrogen bonded to an unsubstituted alkyl group, nitrogen bonded to a substituted aryl group, nitrogen bonded to an unsubstituted aryl group, nitrogen bonded to a substituted alkoxy group, nitrogen bonded to an unsubstituted alkoxy group, and a direct bond between the two aromatic rings; wherein R$^4$ can be said direct bond, so long as the central cyclic oxygen bridged ring contains at least 7 atoms.

2. The composition according to claim 1, wherein at least one of said two aromatic centres is benzene or naphthene.

3. The composition according to claim 1, wherein said central cyclic oxygen bridged ring in said at least one compound according to formula I contains at least 7 atoms.

4. The composition according to claim 3, wherein said at least one compound according to formula I is selected from the chemical components according to formula II, III, IV

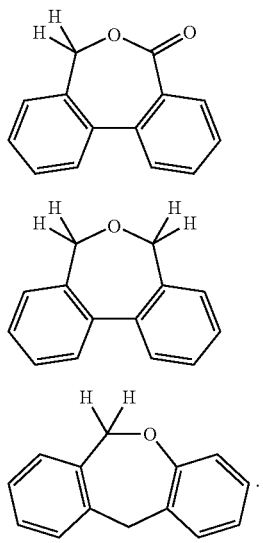

5. The composition according to claim 1, wherein said central cyclic oxygen bridged ring in said at least one compound according to formula I contains 7 atoms.

6. The composition according to claim 1, wherein said epoxy resin comprises an epoxy component (V), which is represented by general formula (V):

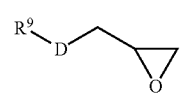

wherein D denotes an oxygen or

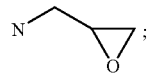

R$^9$ is selected from the group consisting of a straight-chain alkyl group with 1 to 18 carbon atoms, a branched alkyl group with 1 to 18 carbon atoms, an aromatic group with 6 to 12 carbon atoms, a heteroaromatic group with 4 to 12 carbon atoms, a group with the structure

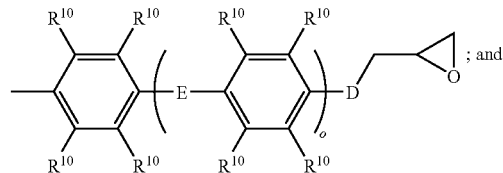

a group with the structure R$^{12}$SiR$^{13}$R$^{14}$R$^{15}$;

wherein:
each R$^{10}$ is independently selected from the group consisting of hydrogen and an alkyl group with 1 to 4 carbon atoms;

o is 0 or 1;

E is selected from the group consisting of a carbon-carbon single bond and CR$^{11}$$_2$ wherein each R$^{11}$ is independently selected from the group consisting of hydrogen and an alkyl group with 1 to 4 carbon atoms;

D is

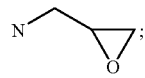

R$^{13}$ and R$^{14}$ are independently selected from the group consisting of a straight-chain alkoxy group with 1-6 carbon atoms, a branched alkoxy group with 1 to 6 carbon atoms, an aryloxy group, and an aralkyloxy group;

R$^{15}$ is selected from the group consisting of a straight-chain alkoxy group with 1-6 carbon atoms, a branched alkoxy group with 1-6 carbon atoms, and aryloxy group, an aralkyloxy group, an aliphatic group, an amino group, halogen, an aromatic group, a heteroaromatic group, an araliphatic group, and a heteroaraliphatic group; and R$^{12}$ is a bridging group selected from the group consisting of an aliphatic group, a heteroaliphatic group, an araliphatic group, a heteroaraliphatic group, an aromatic group, and a heteroaromatic group.

7. The composition according to claim 1, wherein the epoxy resin comprises 20% by weight to 100% by weight, based on the total epoxy component, of a multifunctional epoxy resin, and an optional monofunctional epoxy resin.

8. The composition according to claim 1, wherein said reagent selected from the group consisting of cationic compounds, compounds which are capable of forming cationic compounds, and mixtures thereof is selected from the group consisting of
  Bronsted acids,
  Lewis acids,
  Alkylating reagents,
  Silylating reagents, and
  Onium salts.

9. The composition according to claim 1, wherein the molar ratio between said epoxy resin and said reagent selected from the group consisting of cationic compounds, compounds which are capable of forming cationic compounds, and mixtures thereof, is in the range from 4 to 10000.

10. The composition according to claim 1, wherein the molar ratio between said epoxy resin and said at least one compound according to formula I, is in the range from 0.5 to 100.

11. The composition according to claim 1, further comprising additional components selected from the group consisting of inorganic fillers and organic fillers.

12. A copolymerization product achieved by curing the composition according to claim 1 at a curing temperature of 0° C. to 250° C.

13. A process of suppressing shrinkage in a curable epoxy composition comprising adding a shrinkage-suppressing agent to the curable epoxy composition;
  wherein said curable epoxy composition comprises an epoxy resin and a reagent selected from the group consisting of cationic compounds, compounds which are capable of forming cationic compounds, and mixtures thereof;
  and wherein said shrinkage-suppressing agent comprises at least one compound with two aromatic centres and a central cyclic oxygen bridged ring, connecting the two aromatic centres according to formula I:

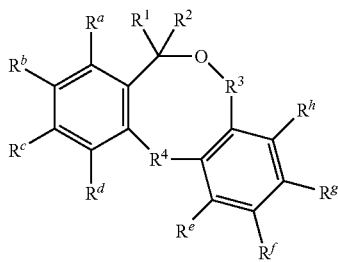

(I)

wherein
  $R^1$ and $R^2$ are independently selected from the group consisting of hydrogen, a substituted alkyl group with a chain length of 1 to 20 carbon atoms, and an unsubstituted alkyl group with a chain length of 1 to 20 carbon atoms;
  $R^a$ to $R^h$ are independently selected from the group consisting of hydrogen, a substituted alkyl group, an unsubstituted alkyl group, a substituted aryl group, an unsubstituted aryl group, a substituted alkoxy group, an unsubstituted alkoxy group, halogen, and an additional aromatic ring formed by two adjacent $R^a$ to $R^h$ moieties;
  $R^3$ is selected from the group consisting of an alkyl bridge with 1-3 carbon atoms, an oxo-substituted alkyl bridge with 1-3 carbon atoms, and a direct bond between the oxygen and the adjacent aromatic ring; wherein $R^3$ can be said direct bond, so long as the central cyclic oxygen bridged ring contains at least 7 atoms; and
  $R^4$ is selected from the group consisting of:
    a substituted alkyl bridge with 1-3 carbon atoms, an unsubstituted alkyl bridge with 1-3 carbon atoms, an oxo-substituted alkyl bridge with 1-3 carbon atoms,
    oxygen,
    sulfur, oxidated sulfur ($=SO$, $SO_2$),
    nitrogen, nitrogen bonded to hydrogen, nitrogen bonded to a substituted alkyl group, nitrogen bonded to an unsubstituted alkyl group, nitrogen bonded to a substituted aryl group, nitrogen bonded to an unsubstituted aryl group, nitrogen bonded to a substituted alkoxy group, nitrogen bonded to an unsubstituted alkoxy group, and
    a direct bond between the two aromatic rings; wherein $R^4$ can be said direct bond, so long as the central cyclic oxygen bridged ring contains at least 7 atoms.

14. The process according to claim 13, wherein a molar ratio between said epoxy resin and said reagent selected from the group consisting of cationic compounds, or compounds which are capable of forming cationic compounds, and mixtures thereof is in the range from 4 to 10000.

15. The process according to claim 13, wherein a molar ratio between said epoxy resin and said at least one compound according to formula I is in the range from 0.5 to 100.

16. A sealant composition comprising the composition according to claim 1.

17. A process of using the sealant composition according to claim 16, wherein the sealant composition is applied to and hardened on or between substrates selected from the group consisting of metals, silicates, metal oxides, concrete, wood, electronic chip material, semiconductor material, and organic polymers.

18. An adhesive composition comprising the composition according to claim 1.

19. A process of using the adhesive composition according to claim 18, wherein the adhesive composition is applied to and hardened on or between substrates selected from the group consisting of metals, silicates, metal oxides, concrete, wood, electronic chip material, semiconductor material, and organic polymers.

20. A coating composition comprising the composition according to claim 1.

21. A process of using the coating composition according to claim 20, wherein the coating composition is applied to and hardened on or between substrates selected from the group consisting of metals, silicates, metal oxides, concrete, wood, electronic chip material, semiconductor material, and organic polymers.

* * * * *